US008007168B2

(12) United States Patent
Bittner et al.

(10) Patent No.: US 8,007,168 B2
(45) Date of Patent: Aug. 30, 2011

(54) METHOD FOR STANDARDIZING THE DERIVATION OF THE TEMPERATURE IN THE MESOPAUSE REGION FROM HYDROXYL (OH*) AIRGLOW (75) Inventors: Michael Bittner, Untermuehlhausen (DE); Kathrin Hoeppner, Starnberg-Perchting (DE)

(73) Assignee: Deutsches Zentrum für Luft-und Raumfahrt e.V., Köln (DE)

( * ) Notice: Subject to any disclaimer, the term of this patent is extended or adjusted under 35 U.S.C. 154(b) by 246 days.

(21) Appl. No.: 12/310,863

(22) PCT Filed: Sep. 20, 2007

(86) PCT No.: PCT/EP2007/008178
§ 371 (c)(1),
(2), (4) Date: Mar. 10, 2009

(87) PCT Pub. No.: WO2008/037391
PCT Pub. Date: Apr. 3, 2008

(65) Prior Publication Data
US 2010/0027580 A1 Feb. 4, 2010

(30) Foreign Application Priority Data

Sep. 25, 2006 (DE) .......................... 10 2006 045 578

(51) Int. Cl.
*G01J 5/00* (2006.01)
(52) U.S. Cl. ........................................ 374/121; 702/130
(58) Field of Classification Search .................. 374/121; 702/130
See application file for complete search history.

(56) References Cited

U.S. PATENT DOCUMENTS

| 3,380,055 | A | | 4/1968 | Fow et al. | |
|---|---|---|---|---|---|
| 4,717,916 | A | * | 1/1988 | Adams et al. | 342/107 |
| 5,667,304 | A | * | 9/1997 | Gelbwachs | 374/137 |
| 5,724,043 | A | | 3/1998 | Savage et al. | |
| 6,318,891 | B1 | | 11/2001 | Haffner et al. | |
| 2008/0202915 | A1 | * | 8/2008 | Hieftje et al. | 204/164 |

FOREIGN PATENT DOCUMENTS

| DE | 1 648 287 | 4/1971 |
|---|---|---|
| DE | 196 32 174 | 2/1998 |

(Continued)

OTHER PUBLICATIONS

International Search Report, Nov. 30, 2007.

(Continued)

*Primary Examiner* — Lisa M Caputo
*Assistant Examiner* — Mirellys Jagan
(74) *Attorney, Agent, or Firm* — Collard & Roe, P.C.

(57) ABSTRACT

In order to derive the temperature in the mesopause region from hydroxyl (OH*) airglow, in which intensities of three lines of OH* emission and a basic position are measured during the night using ground-based IR spectrometers, a noisy OH* spectrum is smoothed by filtering out white noise superimposed on the measured OH* intensities, by means of a spectral analysis method in the form of a harmonic analysis and by means of adaptation using the Voigt function which is carried out in the form of a combination of a Lorentz distribution and a Doppler distribution. A decision is made on the quality of the adaptation of the smoothed spectrum obtained to the original spectrum using statistical characteristic variables and by selecting one of the two methods, harmonic analysis function or Voigt function, and the temperature is thus accurately determined.

3 Claims, 8 Drawing Sheets

FOREIGN PATENT DOCUMENTS

DE 696 27 804 2/2004

OTHER PUBLICATIONS

English translation of Written Communication of the International Searching Authority (Supplemental Sheet).
Williams, P. F. B.: "OH rorational temperatures at Davis, Antarctica, via scanning spectrometer." Planetary and Space Science Elsevier UK, vol. 44, No. 2, Feb. 1996, pp. 163-170, XP002459093. ISSN: 0032-0633, (ISR).
Beig G. et al: "Review of mesospheric temperature trends." Reviews of Geophysics and Space Physics, American Geographic Union, Washington, DC, US, vol. 41, No. 4, 2003, pp. 1-41, XP009092264. ISSN: 0034-6853, (ISR).
Sivjee, G. G. et al: "Temperature and chemistry of the polar mesopause OH." Journal of Geographical Research, Richmond, VA, US, vol. 92, No. A5, May 1, 1987, pp. 4663-4672, XP009092256. ISSN: 0148-0227, (ISR).

* cited by examiner

METHOD FOR STANDARDIZING THE DERIVATION OF THE TEMPERATURE IN THE MESOPAUSE REGION FROM HYDROXYL (OH*) AIRGLOW

CROSS REFERENCE TO RELATED APPLICATIONS

This application is the National Stage of PCT/EP2007/008178 filed on Sep. 20, 2007, which claims priority under 35 U.S.C. §119 of German Application No. 10 2006 045 578.9 filed on Sep. 25, 2006. The international application under PCT article 21(2) was not published in English.

TECHNICAL FIELD

The invention relates to a method for standardizing the derivation of the temperature in the mesopause region from hydroxyl (OH*) airglow, in which method the intensities of three lines of the OH* emission and a basic position are measured during the night using ground-based IR spectrometers.

Figure 1:
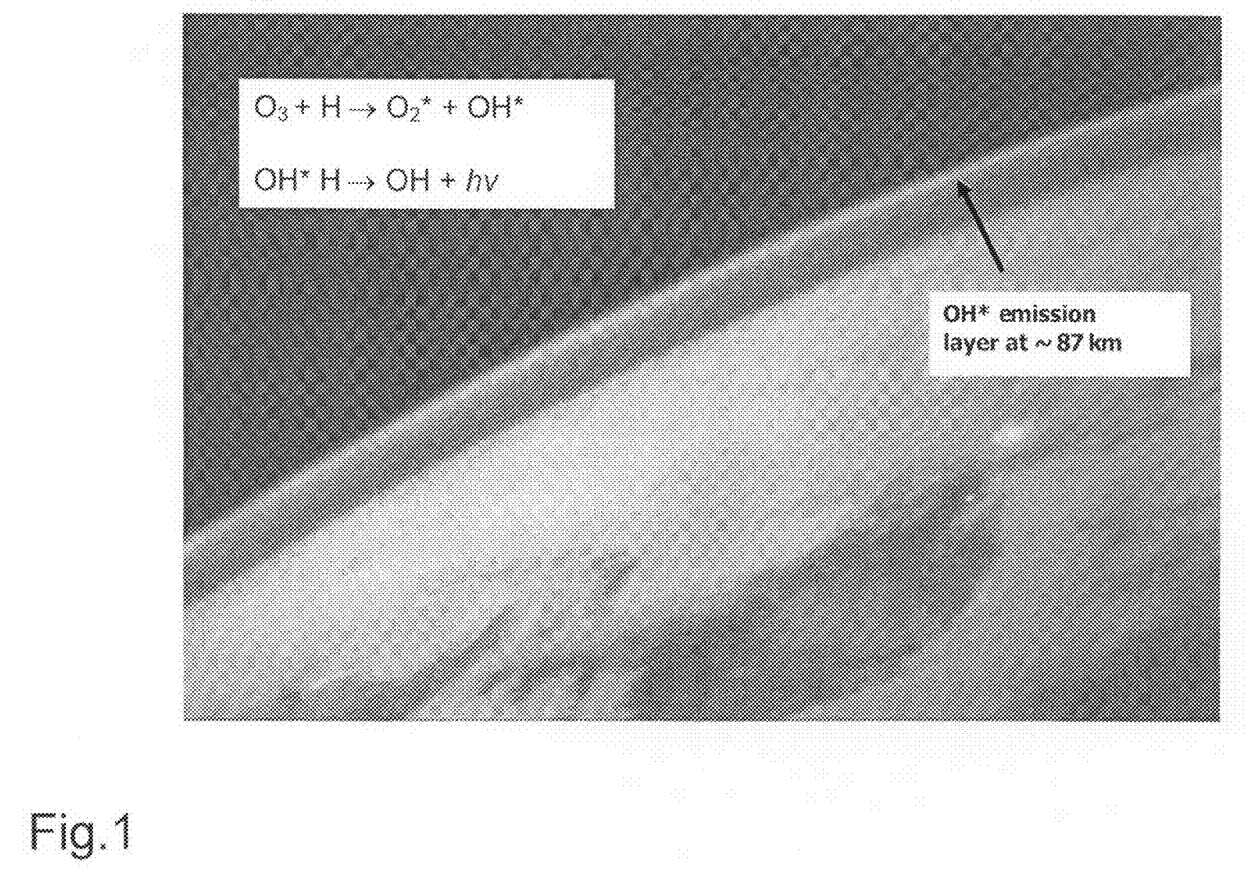
FIG. 1 a picture taken from aboard the satellite Clementine, showing a layer excited by hydroxyl molecules (OH*) at a height level of about 87 km.

For measuring the temperature in the mesopause region, use is made of the circumstance that, in the height region of the mesopause, there exists a layer of excited hydroxyl molecules, OH*, generated by the exothermic reaction of ozone and atomic hydrogen and having a vertical extension of about 8 kilometers, said layer having its center of gravity at substantially 87 kilometers (see FIG. 1). Excited OH* molecules emit radiation in the visible and the near-infrared wavelength range. The emissions of the rotation-vibration transitions of the OH*(3.1) band in the near-infrared range can be detected, respectively during the night, by use of the ground-based IR spectrometers GRIPS (GRound-based Infrared P-branch Spectrometer).

Temperature determination is performed by examination of the emission spectrum of the OH* molecules generated by the following exothermic reaction:

$$O_3 + H \rightarrow O_2^* + OH^* \quad (1)$$

The energy of 322 kJ/mol released by this reaction is sufficient to excite the molecules to the effect that these will perform vibratoral and rotational oscillations; electronically, however, the molecules are in their basic state. During the successive transition from high vibration levels to the basic state, radiation in the visible and infrared wavelength range is emitted.

In the process, the transitions with $\Delta v = 2$ have the largest intensities. The OH*(3.1) transitions which are in the spectral range of 1.52 µm and 1.55 µm (see FIG. 2) are particularly useful for temperature determination because, in these transitions, the so-called "non-local thermodynamic equilibrium (NLTE) effect" is negligible. Thus, a rotational temperature detected from such a measurement is in direct relation to the kinetic temperature.

Figure 2:
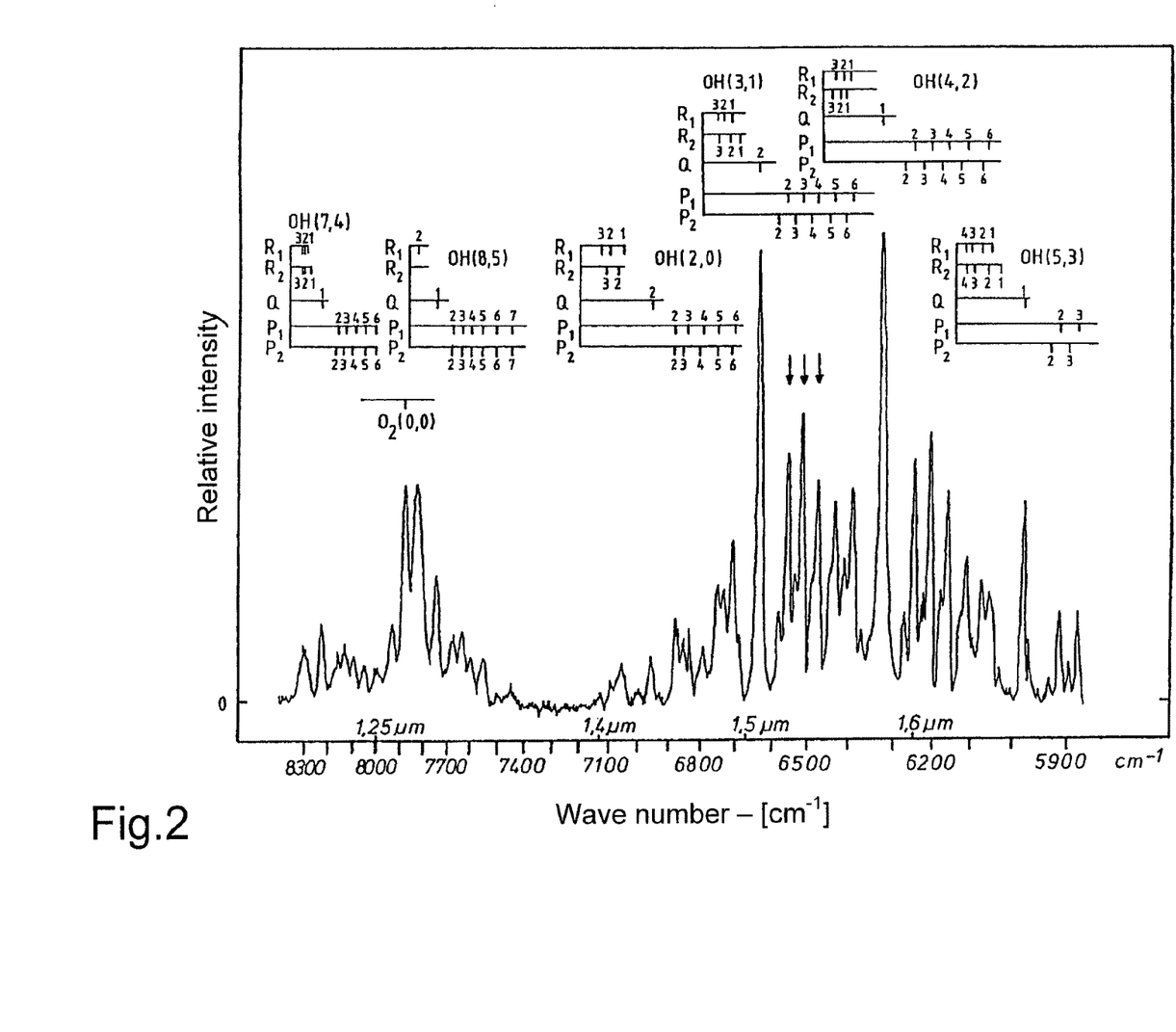
FIG. 2 an airglow spectrum in the range of 1.2 µm to 1.7 µm, the abscissa indicating the wave number ($cm^{-1}$) and the ordinate indicating the relative intensity.

In FIG. 2, an airglow spectrum in the range of 1.2 µm to 1.7 µm is illustrated. Further shown are the OH* vibration bands (5.3), (4.2), (3.1), (2.0), (8.5) and (7.4). The three OH* emission lines used for temperature determination are marked by arrows.

STATE OF THE ART

The derivation of the rotational temperature of the OH* molecule—and thus of the kinetic temperature of the environment—from emission measurements are obtained with the aid of the following interrelationship between the intensity I of the emission of the transition of v'=3 to v"=1 of the OH* molecule and its rotation temperature $T_{rot}$:

$$I_{(v',J',i' \rightarrow v'',J'',i'')} = N_{v'} \cdot A_{(v',J',i' \rightarrow v'',J'',i'')} \cdot \frac{2(2J'+1)}{Q_{v'}(T_{rot})} \cdot \exp\left(\frac{-F(J')_{i',v'}}{k \cdot T_{rot}}\right) \quad (2)$$

wherein $I_{(\ldots)}$ is the intensity of the transition defined by v, J, i [photons $s^{-1} \cdot cm^{-3}$], $N_{v'}$ is the occupation number of the state v' [$cm^{-3}$], $A_{(\ldots)}$ is the Einstein transition coefficient for spontaneous emission [$s^{-1}$], i is the designation of the doublet branch, v is the designation of the vibration level, J is the angular momentum quantum number, $Q_{v'}(T_{rot})$ is the rotation-partition sum, $F_{i,v'}(J')$ is the term value of the rotation level with respect to the vibrational level v' [$cm^{-1}$], k is the Boltzmann constant=0.6948 $cm^{-1}K^{-1}$, and $T_{rot}$ is the rotational temperature [K].

The values $N_{v'}$ and $Q_{v'}(T_{rot})$ are detectable only with difficulties but are equal for all of the three transitions discussed here. In order to reach the desired result without knowledge of these values, equation 2 will first be transformed into:

$$\ln\left(\frac{I_{(v',J',i' \rightarrow v'',J'',i'')}}{2(2J'+1) \cdot A_{(v',J',i' \rightarrow v'',J'',i'')}}\right) = \ln\left(\frac{N_{v'}}{Q_{v'}}\right) - \frac{F(J')_{i',v'}}{k \cdot T_{rot}} \quad (3)$$

$$= konst - \frac{F(J')_{i',v'}}{k \cdot T_{rot}}$$

wherein $$konst \equiv \ln\left(\frac{N_{v'}}{Q_{v'}}\right)$$

For the emission lines of the three measured transitions $P_1(2)$, $P_1(3)$ and $P_1(4)$, it is provided that $\ln(I_{(\ldots)}/[2(2J'+1)*A_{(\ldots)}])$ is plotted against $F_{i,v'}(J')$. Subsequently, a linear regression is performed so as to obtain $K \cdot T_{rot}$ as a reciprocal value of the slope of the regression line. The obtained result of the rotation temperature of the OH* molecules describes the kinetic temperature of the environment.

Figure 3:
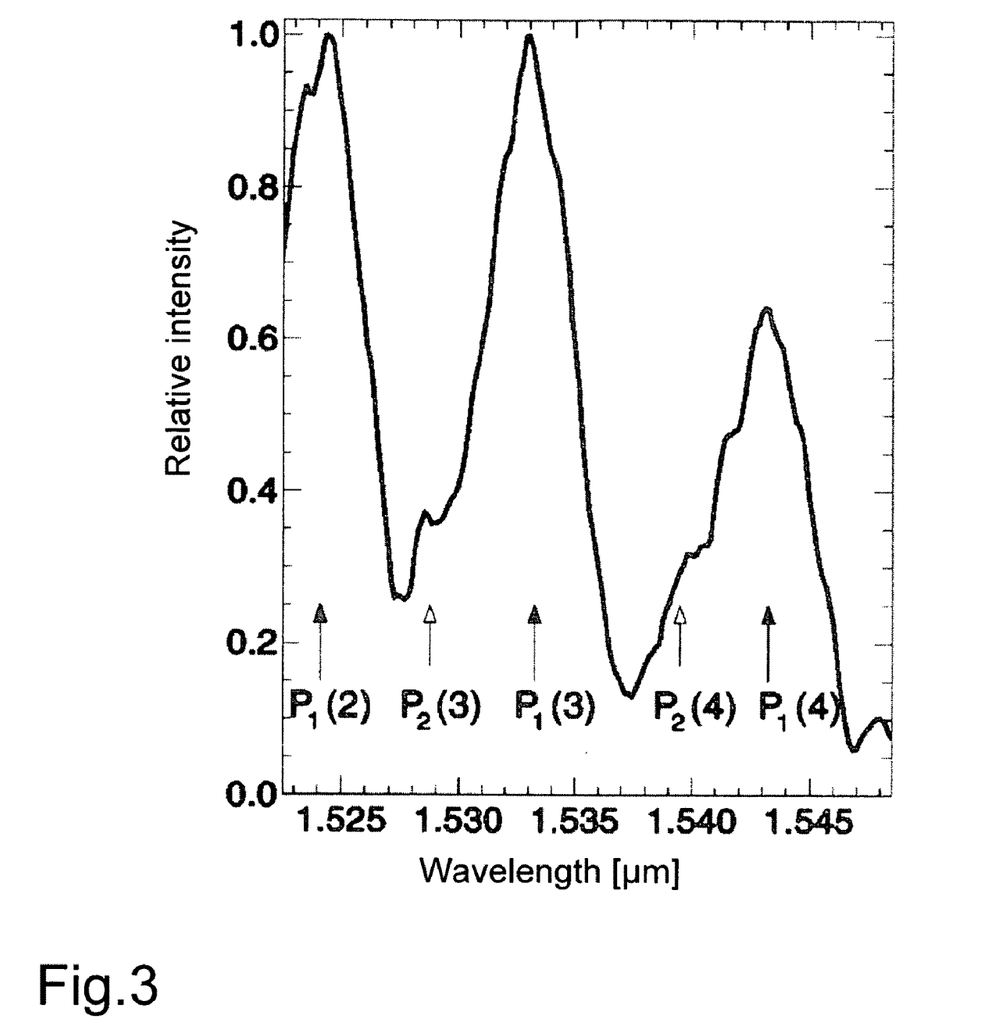
FIG. 3 a typical OH* spectrum recorded by GRIPS, at a rotation temperature of 180 K.

Since, in the presently applied method for temperature derivation, merely four measurement values will suffice for determining the temperature, notably the intensities of three lines of the OH* emissions at the wavelengths of 1.524 µm, 1.533 µm and 1.543 µm (FIG. 3) as well as a background position at about 1.547 µm, only a very small wavelength region between 1.52 µm and 1.55 µm will be covered.

After a nightly measurement period, the measured spectra will be visually examined for their positive usefulness and, if required, "disturbed" spectra will be sorted out. The OH* intensities are superimposed by noise; for this reason, the "good" spectra will be summed up to form a total spectrum. By averaging the spectra, a noise reduction effect is accomplished. In this sum spectrum, the positions of the maxima of the "peaks" of the three OH* emission lines as well as of the already described minimum position will be detected.

During a next step, there will be defined in each individual spectrum those positions of the maxima and of the minimum, respectively, which were previously determined in the sum spectrum for the three emission lines (three maxima) and the background position (one minimum). Thus, due to the superimposed noise, it may happen that the determined maximum does not correspond to the actual intensity maximum of an OH* line but is based on noise. This may have an enormous effect on the to-be-determined temperature value because it will cause an increase of the temperature error.

In the individual spectrum, subsequently, the intensity at these positions will be read. Thus, for each spectrum, four intensity values are obtained, the fourth of them representing the background position for background correction. In each spectrum, the temperature will then be calculated from the three intensity values.

However, the current method for determining the temperature in the mesopause region is performed manually on the basis of OH* intensities measured by GRIPS and thus is of a highly subjective character. Further, in the state-of-the-art determination of temperatures, the problem of signal noise cannot be sufficiently considered; thus, it may occur that a calculated temperature value is completely determined by the noise superimposed on the intensities, thus restricting the reliability of the accuracy of the data.

For measuring the characteristics of the tropopause, DE 696 27 804 T4 (Feb. 26, 2004) describes a device including a frequency-variable microwave radiometer having a frequency range of about 118 to 119 GHz, said radiometer receiving a microwave signal and a frequency selection signal as input signals and generating, as an output signal, a measured power level at a measured frequency corresponding to the frequency output signal which has been input. A feedback control is configured to change the frequency selection signal to a target frequency in such a manner that a minimum value of the measured power level will be generated.

SUMMARY OF THE INVENTION

Thus, it is an object of the invention to provide a method for standardizing the derivation of the temperature in the mesopause region from hydroxyl (OH*) airglow wherein a permanently uniform quality of the examination of the measured data is guaranteed. According to the invention, this is rendered possible, in a method in accordance with the preamble of claim 1, by the features indicated in the characterizing part of the claim. Advantageous modifications are defined in the claims directly or indirectly dependant on claim 1.

A standardizing of the evaluated data performed according to the invention has the advantageous result that a time series of temperatures can be examined objectively and independently, e.g. from climatic trends. Also, the data obtained by means of GRIPS can be evaluated in a fully automated manner, i.e. without supervision, and thus operationally, thereby allowing for comparability of individual measuring instruments, e.g. within a global network (Network for the Detection of Mesopause Change, NDMC) for the routine monitoring of the temperature in the mesopause for climate observation.

DESCRIPTION OF THE INVENTION

Figure 4:
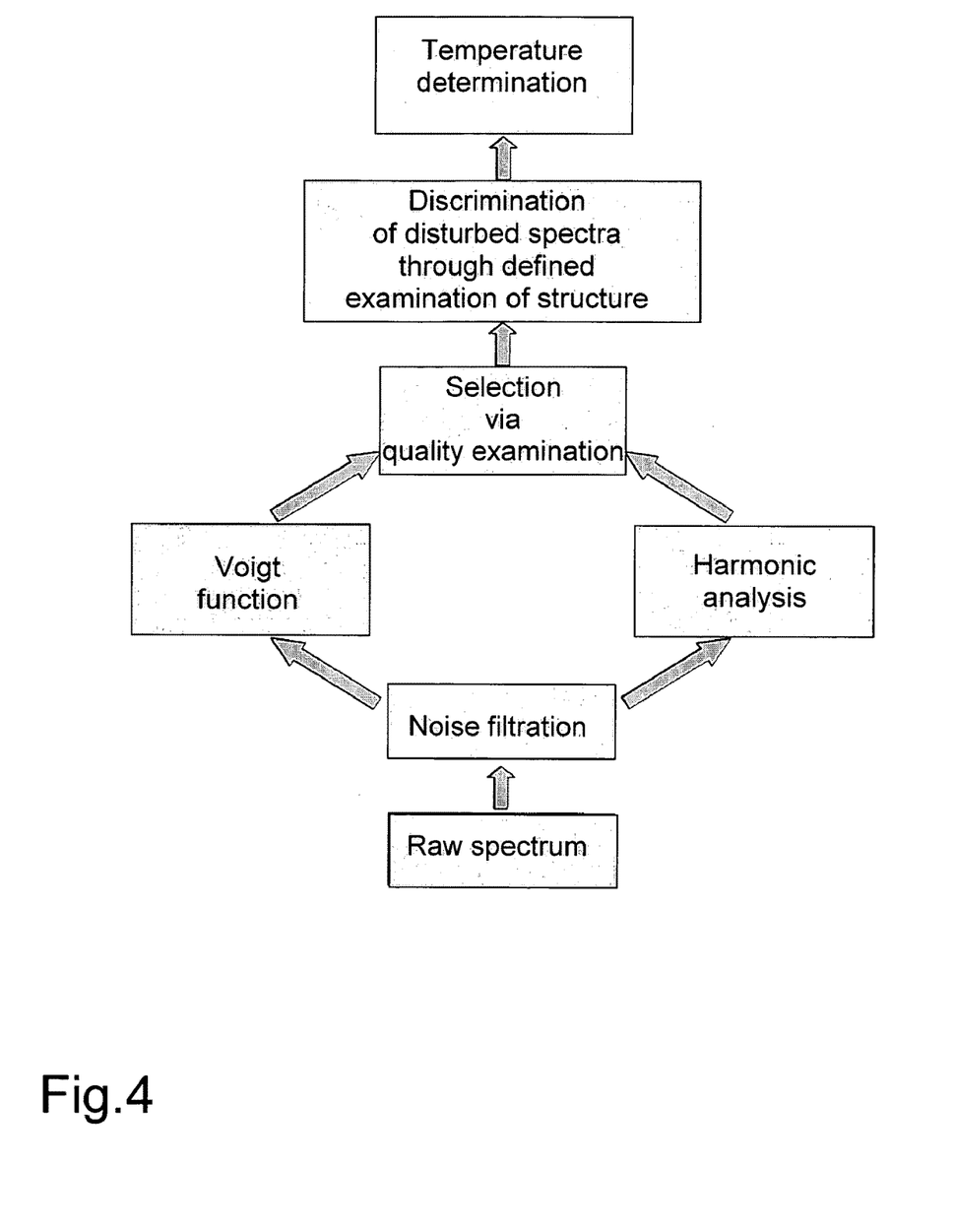
FIG. 4 a block diagram for standardizing the derivation of the temperature in the mesopause region from hydroxyl (OH*) airglow, and FIGS. 5a to 5d examples of spectra of different qualities.

Hereunder, there will be described an approach, graphically represented in FIG. 4, for standardizing the derivation of the temperature in the mesopause region from hydroxyl (OH*) airglow The above described detection of the ratios between the radiation intensities of the vibrational and rotational transitions of P1(2), P1(3) and P1(4) transitions makes it possible to draw favorably accurate conclusions on the temperature at a height level of about 87 km. For each spectrum taken, one temperature value is obtained. In FIGS. 5a to 5d, four "original spectra" of different qualities are represented. The noise of each spectrum is constant since it is white noise and not atmospheric noise.

For the filtration of the noise, two different approaches are utilized in parallel. These are a) a statistically oriented approach and b) a physically motivated approach.

By means of statistical characteristic values (statistical moments), there is detected respectively the quality of the adaptation of the smoothed fit curve to the original spectrum, and there is selected respectively that method for temperature determination which yields the best adaptation.

By the performed adaptation of a spectrum, also called a "fit curve", to the noisy OH* spectrum, temperature determination is made possible also in case of a bad signal to noise ratio in the raw spectrum, resulting in a considerable increase of the data yield. Further, by this method, which is related to the smoothing of noisy spectra and to the associated reliable determination of the temperature value, the individual temperature error is minimized. Also, the difference between the two above mentioned methods allows for a first estimation of the accuracy of the individual temperature value.

The two methods will be briefly described hereunder.

a) Noise is filtered out by means of a useful spectral analysis method, the so-called harmonic analysis (HA) (low-pass filtering). In doing so, the intensity development of a spectrum is modeled by a linear combination of sinusoidal oscillations:

$$\hat{y}(t) = \sum_{i=1}^{n} A_i \cdot \sin\left(\frac{2\pi}{\tau_i} t + \varphi_i\right) \quad (4)$$

wherein
$\hat{y}_t$ a modeled intensity value at the time t,
$A_i$ the amplitude of the i-th oscillation,
$\varphi_i$ the phase of the i-th oscillation, and
$\tau_i$ the period of the i-th oscillation.

With the aid of the least squares method, the model parameters $A_i$, $\varphi_i$ as well as $\tau_i$ are to be estimated to the effect that $$|\hat{y}_t - y_t|^2 \to 0 \quad (5)$$

wherein $\hat{y}_t$ represents the OH* intensity value at the time t.

If the squared amount of equation (5) is 0, the model curve is an exact representation of the development of the data points. Depending on the number of allowed oscillations, there will be modeled ever finer structures in the development of the data.

b) An adaptation is performed via the so-called Voigt function which is a combination of the Lorentz distribution and the Doppler distribution:

$$g(f - f_0) = \frac{\alpha_L}{\pi\sqrt{\pi}\alpha_D} \int_0^\infty \frac{\exp-((f-f')/\alpha_d)^2}{(f'-f_0)^2 + \alpha_L^2} df' \quad (6)$$

where
f represents the frequency,
$f_0$ represents the line center,
$\alpha_L$ represents the Lorentz half-width,
$\alpha_D$ represents the Doppler half-width, and
f' represents the dummy variable via which the integration is performed.

The smoothed spectrum resulting from the methods a) and respectively b) (see the strong lines in FIGS. 5a to 5d as an example of an adaptation by means of the harmonic analysis) will then be utilized for obtaining the three maxima (or the minimum position to be used for an additional method for background correction) and, thereafter, for temperature determination.

Then, before the temperature determination by use of the adapted spectra, there is performed—based on the smoothed spectrum—a discrimination of disturbed spectra by means of an automatic examination of the structure of each spectrum. If a spectrum does not fulfill all the defined structure parameters, it will be eliminated and thus not be admitted to temperature determination. Examples of such structure parameters are the positions of the three OH* peaks which are known in literature; if the peaks are outside the defined range of wavelengths, this spectrum will be classified as "disturbed". Only the "good" spectra will be allowed to run through the further process of temperature determination.

Shown in FIGS. 5a to 5d are four examples of spectra of different qualities which will be briefly described hereunder; the method for noise filtering applied herein is the harmonic analysis (HA).

FIGS. 5a to 5d show examples of various OH* spectra, wherein
a) the thin-lined curves represent the original spectra (intensities versus time in relative units) and
b) the thick-lined curves represent the fit curves obtained by means of the harmonic analysis (HA).

Figure 5A:
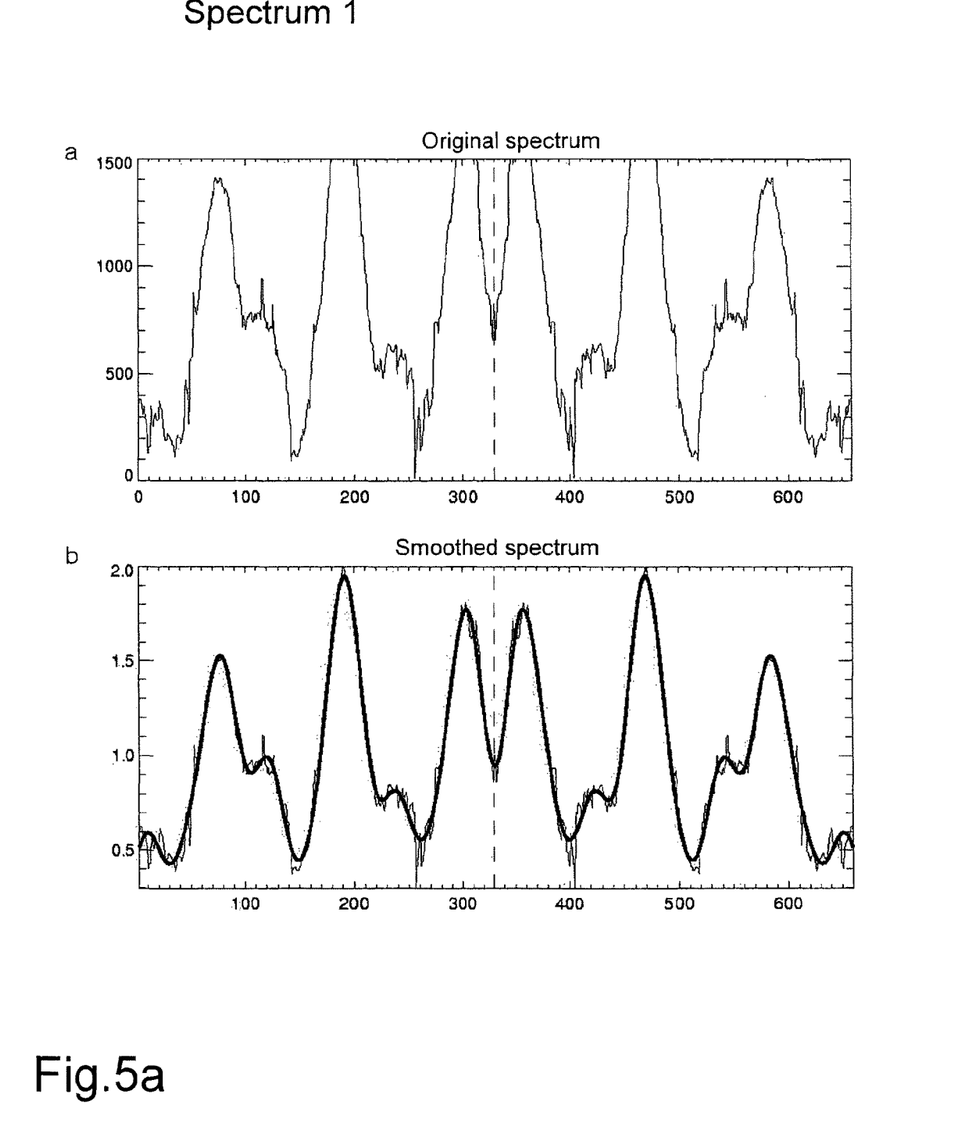

Spectrum 1b in FIG. 5a is a very good spectrum since the fit curve detected by the HA describes the original curve very well.

Figure 5B:
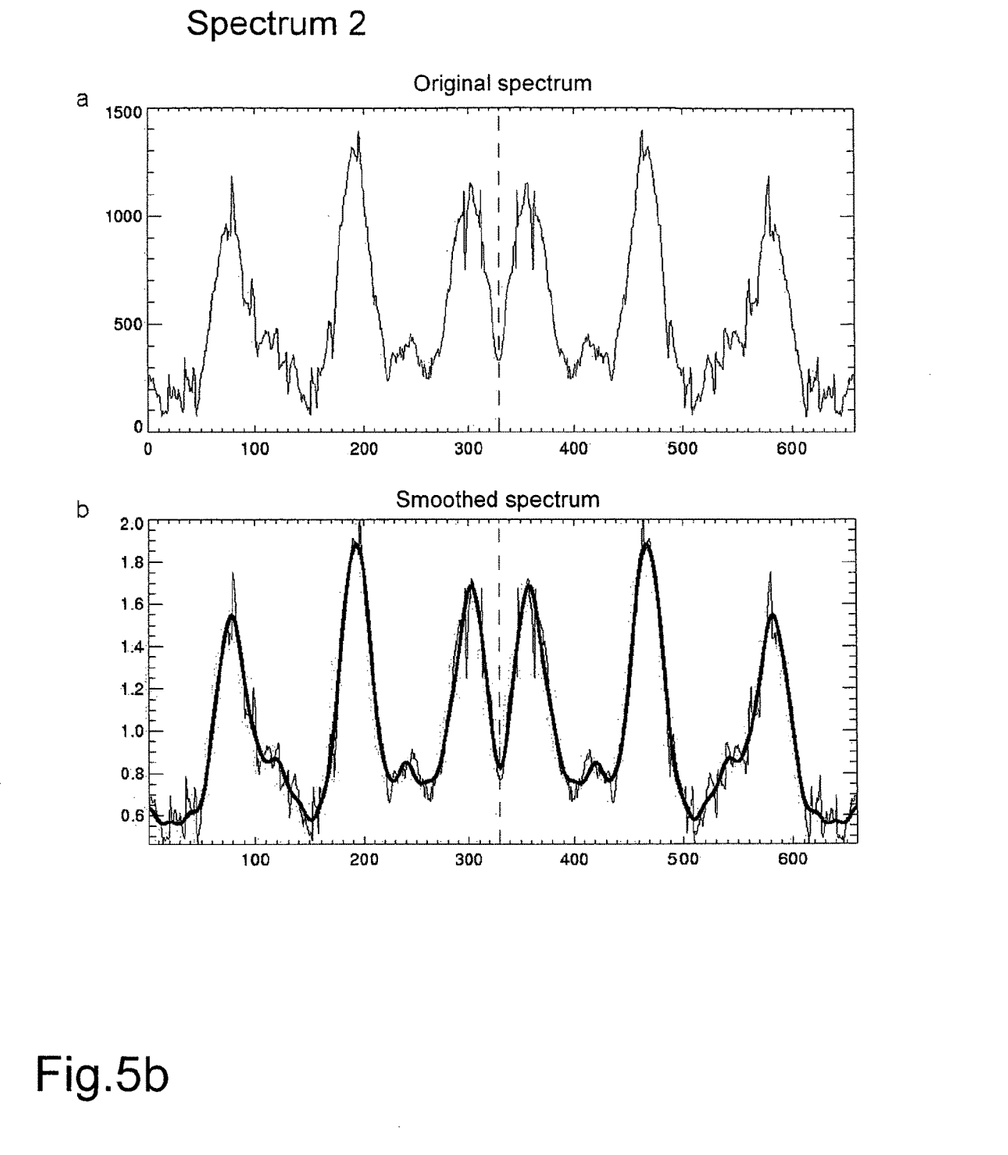

Also spectrum 2b in FIG. 5b is of a very good quality. Only the intensity is somewhat lower than in spectrum 1b of FIG. 5a, which, however is of irrelevant significance for the determination of the temperature because the temperature is derived from the ratios of the three maxima to each other and not from the absolute intensity strengths. Also in spectrum 2b of FIG. 5b, the original curve has been adapted very well by the smoothed spectrum. Outliers will be filtered out by the method of the HA.

Figure 5C:
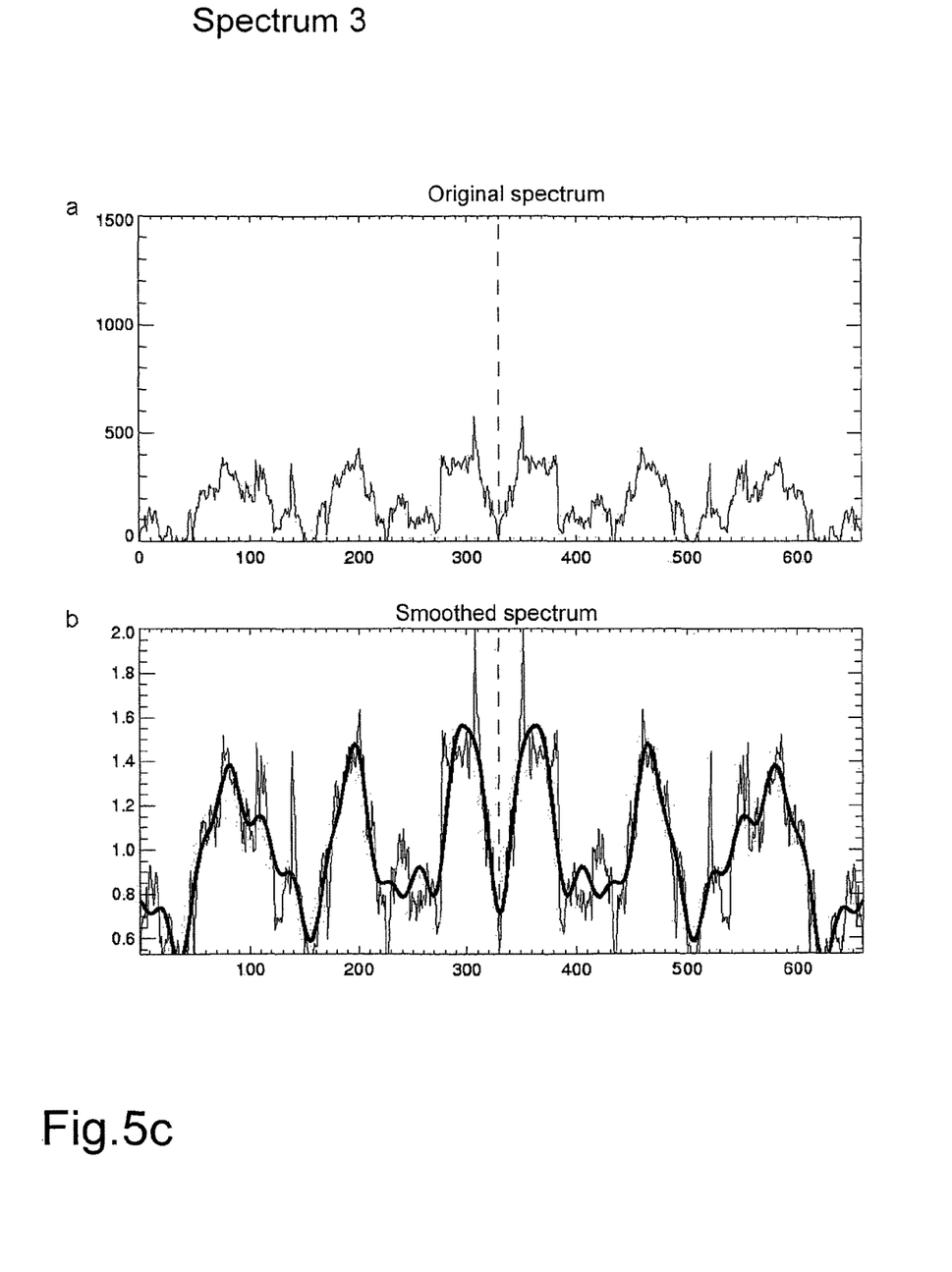

Spectrum 3b in FIG. 5c, in contrast to the first-mentioned two spectra, presents a seemingly rather disturbed spectrum. The examination of this spectrum with respect to its structure parameters, however, will have the result that this spectrum is admitted to further analysis. Said spectrum—even though it has a "worse" visual appearance than the first two spectra—does indeed allow for a determination of a reliable temperature value and thus impressively demonstrates the efficiency of the method.

Figure 5D:
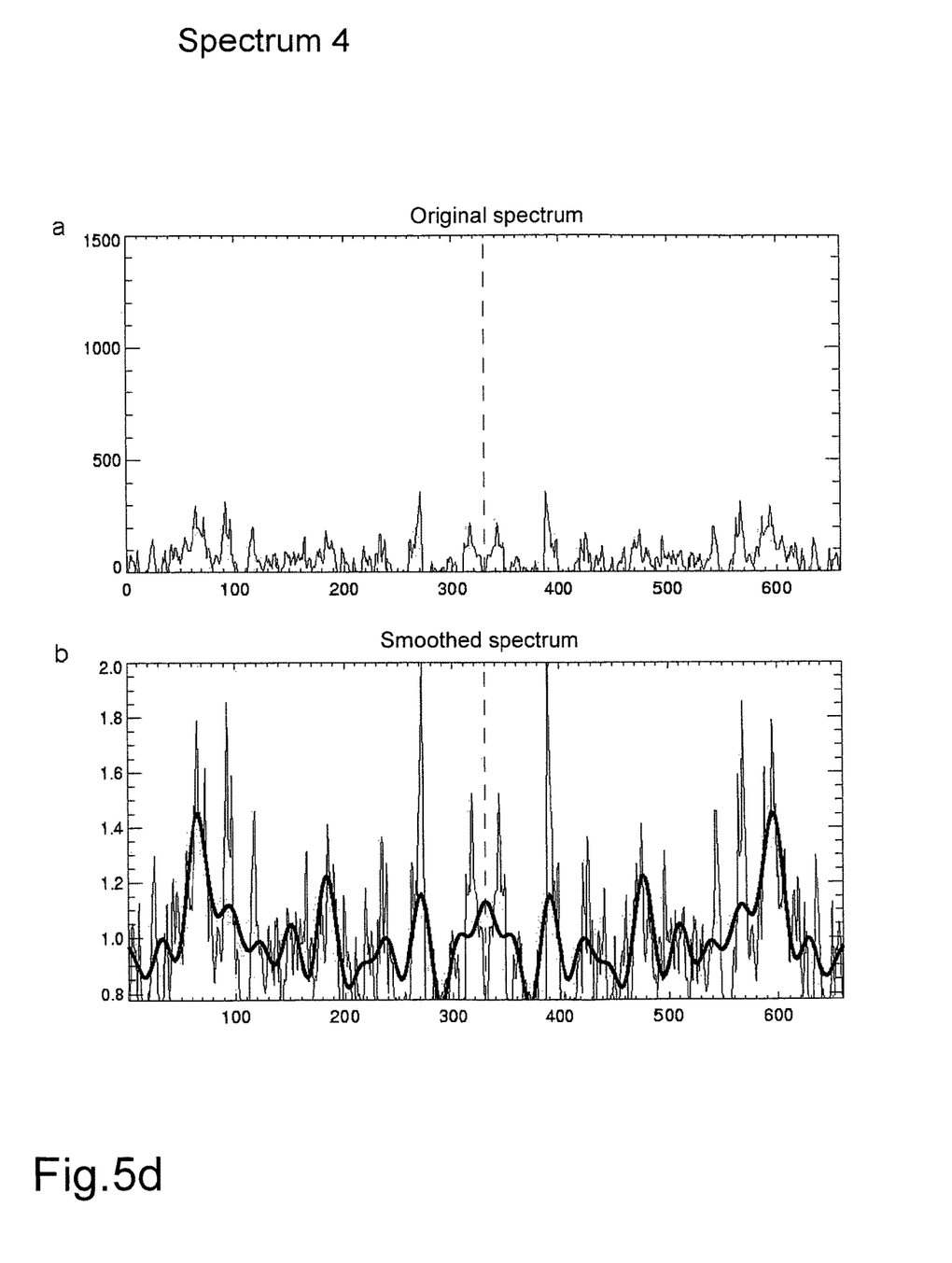

Spectrum 4b in FIG. 5d serves as an example of a very disturbed spectrum. It will fail the structural examination and be automatically eliminated and thus not be admitted to further analysis of the determination of the temperature.

The invention claimed is:
1. A method for standardizing the derivation of the temperature in the mesopause region from hydroxyl (OH*) airglow, in which method the intensities of three lines of OH* emission and of a basic position are measured during the night using ground-based IR spectrometers, characterized in that
   a) a noisy OH* spectrum is smoothed by filtering out white noise superimposed on the measured OH* intensities, by means of a spectral analysis method in the form of a harmonic analysis or by means of adaptation using the Voigt function carried out in the form of a combination of a Lorentz distribution and a Doppler distribution,
   b) on the basis of a smoothed spectrum, a discrimination of disturbed spectra is performed by a defined examination of the structure of each spectrum, and
   c) a decision is made on the quality of the adaptation of the obtained smoothed spectrum to the original spectrum, by use of statistical characteristic variables and by selecting one of the two methods, harmonic analysis function or Voigt function, and the temperature is thereby accurately determined.

2. The method according to claim 1, wherein, in the harmonic analysis, the intensity development of a spectrum is modeled by a linear combination of sinusoidal oscillations, notably according to equation (4)

$$\hat{y}(t) = \sum_{i=1}^n A_i \cdot \sin\left(\frac{2\pi}{\tau_i} t + \varphi_i\right)$$

with $\hat{y}(t)$ representing a modeled intensity value at the point of time t; $A_i$ representing the amplitude of the i-th oscillation; $\varphi_i$ representing the phase of the i-th oscillation; and $\tau_i$ representing the duration of the period of the i-th oscillation; wherein model parameters $A_i$, $\varphi_i$ and $\tau_i$ are estimated by use of the least squares method to the effect that $$|\hat{y}_t - y_t|^2 \to 0$$

with $y_t$ representing the OH* intensity value at the point of time t.

3. The method according to claim 1, wherein the Voigt function is performed, notably according to equation (6)

$$g(f - f_0) = \frac{\alpha_L}{\pi\sqrt{\pi}\,\alpha_D} \int_0^\infty \frac{\exp-((f-f')/\alpha_d)^2}{(f'-f_0)^2 + \alpha_L^2} df'$$

with f representing the frequency, $f_0$ representing the line center, $\alpha_L$ the Lorentz half-width, $\alpha_D$ representing the Doppler half-width and f' representing the dummy variable via which the integration is performed.

* * * * *